June 7, 1927.
P. T. JACKSON
1,631,418
COOKING APPARATUS
Filed May 21, 1926
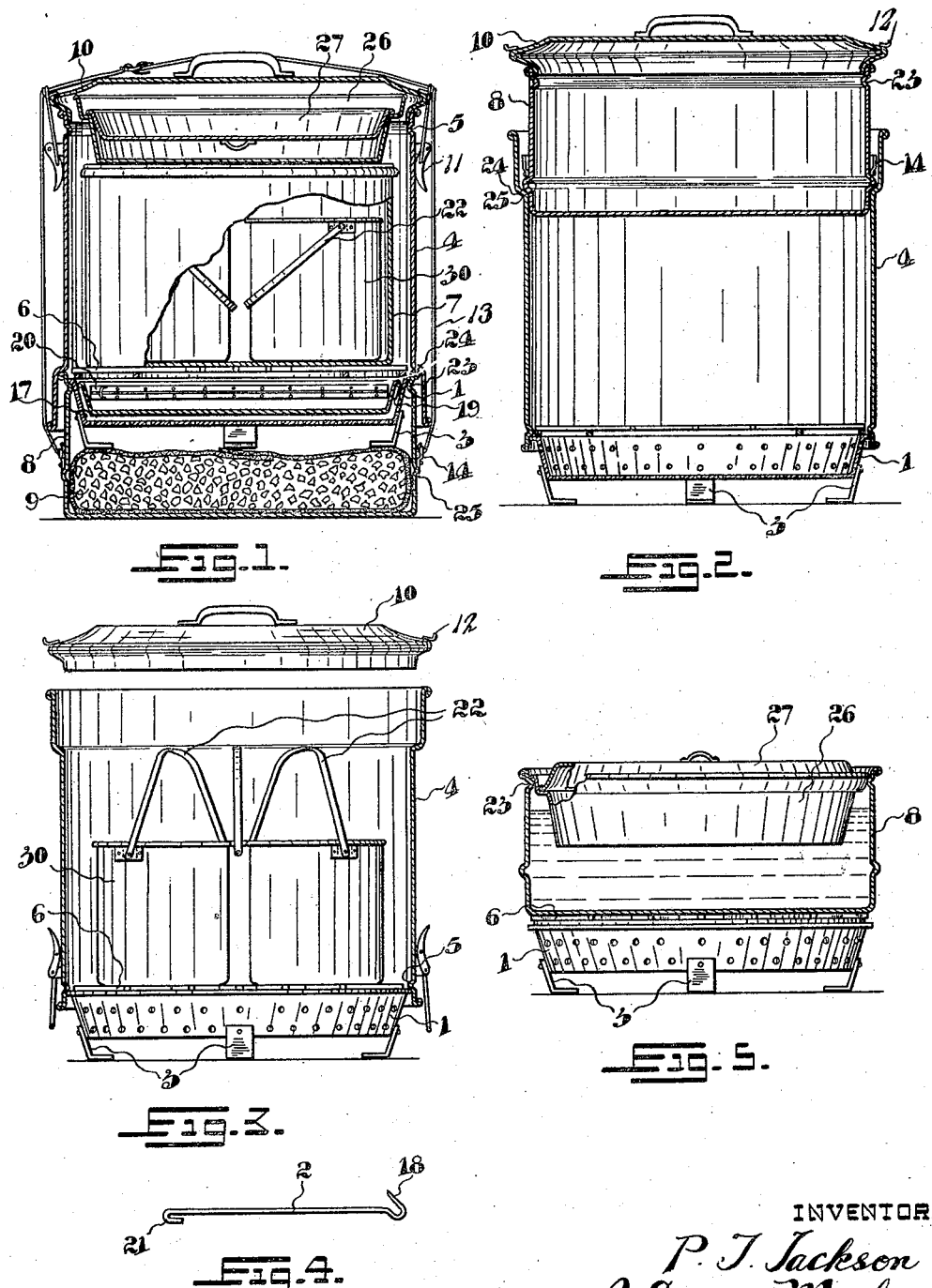

Patented June 7, 1927.

1,631,413

UNITED STATES PATENT OFFICE.

PHILIP T. JACKSON, OF TORONTO, ONTARIO, CANADA.

COOKING APPARATUS.

Application filed May 21, 1926. Serial No. 110,710.

This invention relates to cooking apparatus employing solid fuel such as charcoal, and my object is to devise portable apparatus of this type particularly adapted for camp and picnic purposes which, when not in use, will form a single package containing the fuel basket, culinary utensils, and a supply of fuel.

I attain my object by means of a construction which may be briefly described as follows. A metal cylinder is provided which, when turned with one end down, will rest on the rim of the fuel basket to form a chimney and, when turned the other end down, will slip over the fuel basket and telescope with a pan forming a receptacle for fuel. The pan is also adapted to rest in the upper end of the cylinder, when the latter is supported on the fuel basket, and when in this position forms a warming chamber. A cover is provided adapted to close the upper end of the cylinder when the apparatus is packed, or the upper end of the pan when the latter is used as a warming chamber, or the upper end of the cylinder, when the apparatus is in use, to check the draft through the fire basket. These and other features of the construction are hereinafter fully described and illustrated in the accompanying drawings in which Fig. 1 is a vertical section of the apparatus as packed for transport;

Fig. 2 is a similar view showing it as it appears when in use, with the pan used as a warming closet;

Fig. 3 a similar view showing it in use with the cover suspended above it;

Fig. 4 a side elevation of the frying pan handle; and

Fig. 5 a vertical section of the apparatus arranged as a double boiler.

In the drawings like numerals of reference indicate corresponding parts in the different figures.

1 is a fuel basket having a perforated bottom and side walls. It is also provided with a support comprising legs 3 secured to the basket. 4 is a cylinder which, adjacent one end, is provided with an annular bead forming an inwardly projecting rib 5. This rib is adapted, when the device is in use, to rest on the rim of the basket, as shown in Fig. 2, so that the cylinder forms a flue extending upwardly from the basket. A grid 6 is provided, adapted to rest on the rim of the fuel basket, as shown.

On this grid may be set a pot 7, which may serve as a water pail, and which contains, when the device is packed, the sectional pots 30 of any known type. A pan 8 is provided which, when the device is packed for transport, receives the fuel basket as shown in Fig. 1, the rim of the fuel basket engaging a bead 23 formed below the rim of the pan. The pan is preferably of sufficient depth to enable a supply of fuel 9 to be carried therein beneath the fuel basket.

A pan 26 is provided having a rim adapted to rest on the bead 23 of the pan 8 (see Fig. 5). A cover 27 is also provided adapted to rest on the pan 26. When the pan 8 is partly filled with water and set over the fuel basket, an effective double boiler is obtained.

When the device is packed for transport, the cylinder 4 is turned end-for-end from the position shown in Fig. 3 to the position shown in Fig. 1 in which latter position it is adapted to telescope over the wall of the pan. The extent of the overlap is preferably such that various utensils may be packed within the upper part of the cylinder, over or under the pot or pots 7.

The pan 26, for example, fits neatly within the upper end of the cylinder 4 with its lid or cover 27 in reversed position. In this position the pan provides storage for any small utensils such as plates, etc. The extent of the overlap is determined by the shoulder 24 formed by enlarging the diameter of the cylinder a short distance from one end. This enlargement also provides room for the ears 14 on the pan 8 when the parts are in the position shown in Fig. 2.

A lid 10 is provided which fits either the upper end of the cylinder, as shown in Fig. 1, or the pan 8, as shown in Fig. 2, or the end of the cylinder which is shown uppermost in Fig. 3. This lid may be held in position by toggle clips 11 of known type pivoted on the cylinder 4 and adapted to engage the lugs 12, secured to the lid. A strap 13 is also preferably provided adapted to be secured to the ears 14 on the pan and to pass over the cylinder and lid to hold the parts together for transport.

If plenty of draft is desired, the upper end of the cylinder will remain open as shown in Fig. 3. If it is desired to check the draft, the lid 10 may be placed on top of the cylinder, when the hot products of combustion have to flow out through the upper holes in the sides of the fuel basket, the air for supporting combustion entering either through the bottom or through the lower holes in the sides.

The pan 8 may be used as a warming closet, and to enable it to thus function it is shaped to enter the upper end of the cylinder 4 and a bead 25 formed on its wall engages the shoulder 24 of the cylinder. The lid 10 may be used to form the top of the warming closet as shown in Fig. 2.

For use with the device a frying pan 17 is provided which may be packed within the fuel basket as shown. This is provided with a removable handle 2 provided with a bent end 18 adapted to be hooked in a keeper 19 when the pan is in use.

The handle 2 may also be formed with a hook 21, at its other end. The pots are preferably provided with bails 22 by means of which they may be lifted out of the cylinder and which are engageable by the hooks 18 and 21. The method of using the different utensils requires no particular description.

A toasting grid 20, of any known type, may also be packed within the fuel basket.

From the above description it will be seen that I have devised cooking apparatus which will pack in very little space and which may be used in a variety of ways for boiling, frying, toasting, or warming.

What I claim is:

1. In cooking apparatus the combination of a fuel basket; and a cylinder adapted, when positioned one end up, to rest on the rim of the fuel basket, and when turned with the other end up, to slip over and enclose the fuel basket.

2. In cooking apparatus the combination of a fuel basket; a pan adapted to receive the fuel basket; and a cylinder adapted, when positioned one end up, to rest on the rim of the fuel basket, and when turned with the other end up, to slip over and telescope with the upper part of the pan.

3. In cooking apparatus the combination of a fuel basket; a pan adapted to receive the fuel basket; and a cylinder adapted, when positioned one end up, to rest on the rim of the fuel basket, and when turned with the other end up, to slip over and telescope with the upper part of the pan, the pan being adapted to support the fuel basket in spaced relationship to the pan bottom and to fit within the cylinder.

4. In cooking apparatus the combination of a fuel basket; a pan adapted to receive the fuel basket; and a cylinder adapted, when positioned one end up, to rest on the rim of the fuel basket, and when turned with the other end up, to slip over and telescope with the upper part of the pan, the pan being adapted to be supported in the cylinder adjacent the upper end thereof when the latter is resting on the rim of the fuel basket.

5. Cooking apparatus constructed as set forth in claim 4 provided with a cover adapted to close either end of the cylinder or the pan as may be required.

6. In cooking apparatus the combination of a fuel basket; and a cylinder adapted, when positioned with one end up, to rest on the rim of the fuel basket, and when turned with the other end up, to slip over and enclose the fuel basket; and a grid adapted to rest on the fuel basket.

7. In cooking apparatus the combination of a fuel basket provided with air inlets and also openings formed in its sides at a higher level than the said air inlets; an imperforate cylinder open at each end and adapted to rest on the fuel basket; a cover adapted to close the upper end of the cylinder, whereby the upper openings serve as air inlets when the cylinder is uncovered and as outlets for the products of combustion when the cylinder is covered, and means directly supportable by the fuel basket for supporting cooking utensils.

8. In cooking apparatus the combination of a fuel basket provided with a perforated bottom and sides; supporting means for the basket adapted to permit of the free access of air to the underside of the basket; an imperforate cylinder open at each end and adapted to rest on the fuel basket; a cover adapted to close the upper end of the cylinder, whereby the openings in the sides serve as air inlets when the cylinder is uncovered and as outlets for the products of combustion when the cylinder is covered; and means directly supportable by the fuel basket for supporting cooking utensils.

9. In cooking apparatus the combination of a fuel basket having perforations in its sides at different levels; an imperforate cylinder open at each end and adapted to rest on the fuel basket; a cover adapted to close the upper end of the cylinder, whereby the openings at the higher level serve as air inlets when the cylinder is uncovered and as outlets for the products of combustion when the cylinder is covered; and means directly supportable by the fuel basket for supporting cooking utensils.

10. In cooking apparatus the combination of a fuel basket; a cylinder adapted to fit over the fuel basket having an internal bead adjacent one end adapted to rest on the rim of the fuel basket and having its diameter increased a short distance from the opposite end to form an internal shoulder; and a pan outside which the cylinder will telescope when turned large end downwards, the pan being provided with a bead adapted to rest on the shoulder aforesaid when the cylinder is supported on the rim of the fuel basket.

11. In cooking apparatus the combination of a fuel basket; a pan having its bottom adapted to rest on the rim of the fuel basket, the said pan having an internal bead formed adjacent its open end; and a cooking pan formed with a rim adapted to rest on the aforesaid bead.

12. In cooking apparatus the combination of a fuel basket; a pan having its bottom adapted to rest on the rim of the fuel basket, the said pan having an internal bead formed adjacent its open end; a cooking pan formed with a rim adapted to rest on the aforesaid bead; and a domed cover adapted to rest on the rim of the cooking pan with either side up.

Signed at Toronto, Canada, this 18th day of May 1926.

PHILIP T. JACKSON.